United States Patent
Yun et al.

(10) Patent No.: US 12,158,654 B2
(45) Date of Patent: Dec. 3, 2024

(54) POLARIZING PLATE FOR DISPLAY DEVICE AND DISPLAY DEVICE COMPRISING THE SAME

(71) Applicant: LG Chem, Ltd., Seoul (KR)

(72) Inventors: Ha-Song Yun, Daejeon (KR); Na-Hee Kim, Daejeon (KR); Yoon-Kyung Kwon, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/921,204

(22) PCT Filed: Oct. 8, 2021

(86) PCT No.: PCT/KR2021/013950
§ 371 (c)(1),
(2) Date: Oct. 25, 2022

(87) PCT Pub. No.: WO2022/080787
PCT Pub. Date: Apr. 21, 2022

(65) Prior Publication Data
US 2023/0168536 A1   Jun. 1, 2023

(30) Foreign Application Priority Data
Oct. 16, 2020  (KR) .................. 10-2020-0134636

(51) Int. Cl.
*G02F 1/1335* (2006.01)
*C09J 7/10* (2018.01)
(Continued)

(52) U.S. Cl.
CPC .......... *G02F 1/133528* (2013.01); *C09J 7/10* (2018.01); *C09J 7/385* (2018.01); *C09J 11/04* (2013.01);
(Continued)

(58) Field of Classification Search
CPC ............. G02F 1/133528; G02F 1/1347; G02F 2202/28; C09J 7/10; C09J 7/385; C09J 11/04; C09J 2203/326; C09J 2433/00
See application file for complete search history.

(56) References Cited

U.S. PATENT DOCUMENTS

2007/0267133 A1   11/2007   Matano et al.
2009/0147186 A1    6/2009   Nakai et al.
(Continued)

FOREIGN PATENT DOCUMENTS

| CN | 101263417 A | 9/2008 |
| CN | 104620142 A | 5/2015 |

(Continued)

OTHER PUBLICATIONS

BOE Technology Group Co., Ltd., "SID Display Week 2019: a showcase for BOE's leading-edge display technologies," May 15, 2019, 3 Pages.
(Continued)

*Primary Examiner* — James A Dudek
(74) *Attorney, Agent, or Firm* — Lerner David LLP

(57) ABSTRACT

A polarizing plate and a display device including the same is disclosed herein. In some embodiments, a polarizing plate includes a polarizer which allows only light polarized in a specific direction to pass through; and a haze adhesive film disposed on a one surface of the polarizer and having a haze of 49% to 65%, wherein the haze adhesive film is configured to adhere to the display device, and reduce moire occurring in the dual cell structure of the display device.

12 Claims, 4 Drawing Sheets

(51) Int. Cl.
*C09J 7/38* (2018.01)
*C09J 11/04* (2006.01)
*G02F 1/1347* (2006.01)

(52) U.S. Cl.
CPC ....... *G02F 1/1347* (2013.01); *C09J 2203/326* (2013.01); *C09J 2433/00* (2013.01); *G02F 2201/50* (2013.01); *G02F 2202/28* (2013.01)

(56) References Cited

U.S. PATENT DOCUMENTS

| | | | |
|---|---|---|---|
| 2009/0165943 | A1 | 7/2009 | Kim |
| 2012/0314160 | A1 | 12/2012 | Hwang et al. |
| 2015/0226999 | A1 | 8/2015 | Fuchida et al. |
| 2017/0160446 | A1* | 6/2017 | Nonaka ................ G02B 5/0242 |
| 2018/0299726 | A1 | 10/2018 | Oka et al. |
| 2019/0258101 | A1 | 8/2019 | Yasui et al. |
| 2020/0033600 | A1 | 1/2020 | Kweon et al. |
| 2021/0027728 | A1 | 1/2021 | Kimura |
| 2021/0223453 | A1 | 7/2021 | Seo et al. |
| 2022/0004053 | A1* | 1/2022 | Zhang ............... G02F 1/133601 |
| 2023/0038437 | A1* | 2/2023 | Zhang ............... G02F 1/133528 |

FOREIGN PATENT DOCUMENTS

| | | |
|---|---|---|
| CN | 109983397 A | 7/2019 |
| CN | 111213078 A | 5/2020 |
| JP | H11-223712 A | 8/1999 |
| JP | 2007-332341 A | 12/2007 |
| JP | 5552516 B2 | 7/2014 |
| JP | 2018-180290 A | 11/2018 |
| JP | 201928196 A | 2/2019 |
| JP | 2019184841 A | 10/2019 |
| KR | 19980040861 A | 8/1998 |
| KR | 20070090654 A | 9/2007 |
| KR | 20100077906 A | 7/2010 |
| KR | 20110098688 A | 9/2011 |
| KR | 20160040051 A | 4/2016 |
| KR | 20170004137 A | 1/2017 |
| KR | 20180131628 A | 12/2018 |
| KR | 20200115520 A | 10/2020 |
| WO | 2007/040127 A1 | 4/2007 |
| WO | 2009/025360 A1 | 2/2009 |
| WO | 2018/096569 A1 | 5/2018 |

OTHER PUBLICATIONS

International Search Report for Application No. PCT/KR2021/013950 mailed Jan. 27, 2022, 2 pages.

Search Report dated Feb. 28, 24 from the Office Action for Chinese Application No. 202180014466.5 Issued Feb. 29, 2024, pp. 1-2.

Zhao, J., "Polymer Chemistry and Physics", China Light Industry Press, Feb. 2010, p. 141 (7 pages). [Providing English Translation of Abstract only].

Search Report dated Jul. 30, 2024 from the Office Action for Chinese Application No. 202180014466.5 issued Aug. 1, 2024, 2 pages.

* cited by examiner

POLARIZING PLATE FOR DISPLAY DEVICE AND DISPLAY DEVICE COMPRISING THE SAME

CROSS-REFERENCE TO RELATED APPLICATIONS

The present application is a national phase entry under 35 U.S.C. § 371 of International Application No. PCT/KR2021/013950, filed on Oct. 8, 2021, which claims the benefit of Korean Patent Application No. 10-2020-0134636, filed on Oct. 16, 2020, the disclosures of which are incorporated by reference herein.

TECHNICAL FIELD

The present disclosure relates to a polarizing plate used in a display device and a display device comprising the same, and more particularly, to a polarizing plate used in a display device having a dual cell structure and a display device comprising the same.

BACKGROUND ART

An optical device such as a liquid crystal display (LCD) or an organic light-emitting diode (OLED) uses a polarizing plate to control the optical activity or birefringence or prevent reflection of external light.

Meanwhile, recently, to achieve high-end resolution of the LCD device, a so-called dual cell display including LCD cells stacked in two layers is being applied. In particular, the dual cell display improves contrast in an attempt to overcome the drawback of the LCD having difficulty in producing black (dark).

However, the display device using the polarizing plate shows a moire or rainbow phenomenon, i.e., a phenomenon in which interference patterns show up in the display when two or more periodic patterns overlay on top of the other, which distracts a user's eyes, resulting in low visibility. In particular, since the dual cell display includes one more LCD cell stacked in a periodic pattern, the moire or rainbow phenomenon gets severer.

DISCLOSURE

Technical Problem

The present disclosure is directed to providing a polarizing plate for a display device having a dual cell structure with reduced moire or rainbow phenomenon of the display device.

The present disclosure is further directed to providing a display device having a dual cell structure with reduced moire or rainbow phenomenon.

Technical Solution

To solve the above-described technical problem, according to an embodiment of the present disclosure, there is provided a polarizing plate for a display device.

That is, a polarizing plate according to a first embodiment is a polarizing plate used in a display device having a dual cell structure, the polarizing plate including a polarizer which allows only light polarized in a specific direction to pass through; and a haze adhesive film disposed on any one surface of the polarizer, wherein the haze adhesive film adheres to the display device, and has haze of 49% to 65% to reduce moire occurring by the dual cell structure of the display device.

According to a second embodiment of the present disclosure, in the first embodiment, the haze of the haze adhesive film may be 50% to 60%.

According to a third embodiment of the present disclosure, in the first or second embodiment, the haze adhesive film may be 20 to 22 μm in thickness.

According to a fourth embodiment of the present disclosure, in at least one of the first to third embodiments, the polarizing plate may further include protective films, each stacked between one surface of the polarizer and the haze adhesive film and on the other surface of the polarizer.

According to a fifth embodiment of the present disclosure, in at least one of the first to fourth embodiments, the haze adhesive film may be formed by uniformly dispersing beads having haze in an acrylic polymer, and according to a sixth embodiment of the present disclosure, the beads having haze may be silica beads.

In addition, to solve the above-described technical problem, according to another embodiment of the present disclosure, there is provided a display device.

That is, a display device of a seventh embodiment includes at least two layers of display cells including an upper display cell and a lower display cell disposed at higher and lower positions, each having a matrix array to display an image; and at least three layers of polarizing plates including an upper polarizing plate disposed on the upper display cell, an intermediate polarizing plate disposed between the upper display cell and the lower display cell and a lower polarizing plate disposed under the lower display cell, wherein any one of the upper polarizing plate, the intermediate polarizing plate and the lower polarizing plate is defined in any one of the first to sixth embodiments described above.

According to an eighth embodiment of the present disclosure, in the seventh embodiment, the display device may not include an element which restricts a viewing angle.

According to a ninth embodiment of the present disclosure, in the seventh or eighth embodiment, the display device may be an automobile display device mounted in a vehicle.

According to a tenth embodiment of the present disclosure, in at least one of the seventh to ninth embodiments, the any one polarizing plate may be the upper polarizing plate, and the upper polarizing plate may be stacked on the upper display cell such that the haze adhesive film of the upper polarizing plate is disposed under the polarizer.

According to an eleventh embodiment of the present disclosure, in at least one of the seventh to ninth embodiments, the any one polarizing plate may be the lower polarizing plate, and the lower polarizing plate may be stacked under the lower display cell such that the haze adhesive film of the lower polarizing plate is disposed on the polarizer.

According to a twelfth embodiment of the present disclosure, in at least one of the seventh to ninth embodiments, the any one polarizing plate may be the intermediate polarizing plate, and the intermediate polarizing plate may be stacked between the upper display cell and the lower display cell such that the haze adhesive film of the intermediate polarizing plate is disposed on or under the polarizer.

According to a thirteenth embodiment of the present disclosure, in at least one of the seventh to twelfth embodiments, any one of the upper display cell and the lower display cell may be a color liquid crystal display (LCD) cell, and the other may be a black and white LCD cell or a color LCD cell.

Advantageous Effects

Since the polarizing plate for a display device according to the present disclosure has an adhesive film with a predetermined range of haze, it is possible to reduce the moire or rainbow phenomenon caused by the dual cell structure of the display device.

BEST MODE

Hereinafter, the present disclosure will be described in detail with reference to the accompanying drawings. The terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Figure 1A:
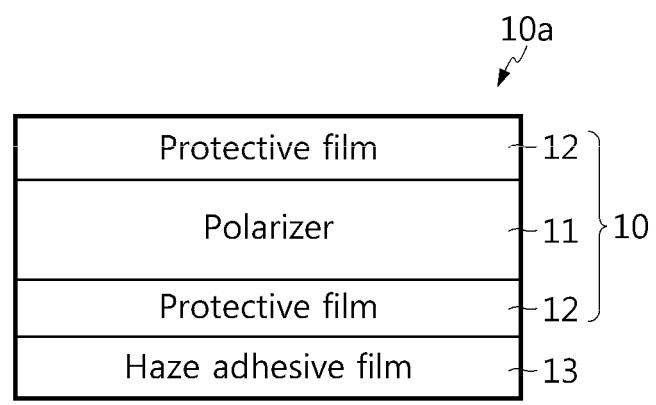
FIGS. 1A and 1B are a schematic cross-sectional views of a polarizing plate for a display device according to embodiments of the present disclosure.
Figure 1B:
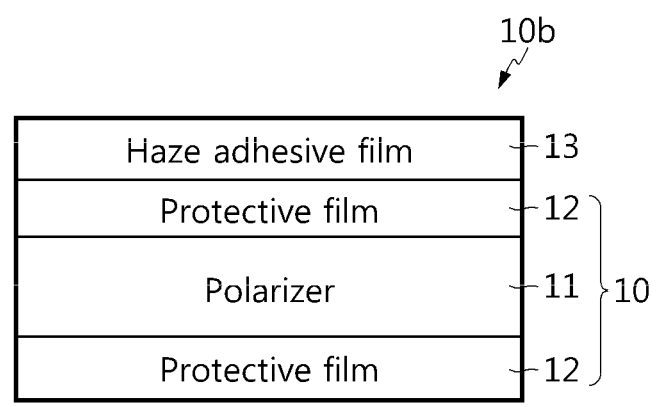

FIGS. 1A and 1B are schematic cross-sectional views showing the structure of a polarizing plate for a display device, in particular, a liquid crystal display (LCD) having a dual cell structure according to an embodiment of the present disclosure.

The polarizing plate according to an embodiment of the present disclosure is a polarizing plate used in a display device having a dual cell structure, and as shown in FIGS. 1A and 1B, the polarizing plate includes a polarizer 11 which allows only light polarized in a specific direction to pass through, and a haze adhesive film 13 disposed on any one surface of the polarizer 11, and the haze adhesive film 13 adheres to the display device and has haze of 49% to 65% to reduce moire caused by the dual cell structure of the display device.

As described above, the dual cell display including LCD cells stacked in two layers shows a severe moire or rainbow phenomenon.

The inventors found that the problem can be solved when a polarizing plate having a predetermined range of haze is used as a polarizing plate used in a display device, and they completed the present disclosure.

That is, when the haze of the haze adhesive film 13 is less than 49%, the moire phenomenon may be not sufficiently reduced, and when the haze exceeds 65%, it may be difficult to provide sufficient brightness to the display device. The haze of the haze adhesive film is more preferably 50% to 60%.

The polarizer 11 is a film which converts natural light or polarized light to polarized light, typically, specific linear polarized light. The polarizer 11 may include a well-known polarizer, for example, a polyvinylalcohol-based polarizer, and more specifically, a film including polyvinylalcohol or its derivatives such as a polyvinylalcohol film and a partially formalized polyvinylalcohol film, in which iodine or a dichronic material, for example, dichronic dye is adsorbed and stretched, and a dehydration product of polyvinylalcohol. In particular, the polarizer 11 may include a polyvinylalcohol-based film containing iodine, but is not limited thereto.

The haze adhesive film 13 may be formed by uniformly dispersing beads having haze in an adhesive film base of an adhesive film component commonly used in a polarizing plate of a display device, for example, an acrylic polymer. The beads having haze may be, for example, silica beads. The method for uniformly dispersing the beads having haze in the base polymer resin is well known in the art. For example, the haze adhesive film may be manufactured by preparing an adhesive composition in which an acrylic adhesive composition including a crosslinkable acrylic polymer having a crosslinkable functional group and an epoxy curing agent or an isocyanate-based curing agent such as toluenediisocyanate or xylenediisocyanate is dissolved in a solvent, adding beads having haze to the adhesive composition, stirring to disperse the beads, coating the composition on a substrate and thermally curing it. Hereinafter, it will be described in more detail for illustrative purposes.

In the crosslinkable acrylic polymer having the crosslinkable functional group, the crosslinkable functional group includes, to be specific, a carboxyl group, a hydroxyl group and an amino group. Among them, the carboxyl group and the hydroxyl group are desirable, and especially, the carboxyl group is desirable since high adhesion strength is obtained by reaction with the isocyanate-based curing agent as described below.

Specific examples of a crosslinkable monomer for forming the crosslinkable acrylic polymer having the crosslinkable functional group may include ethylenically unsaturated carboxylic acid such as (meth)acrylic acid, itaconic acid, crotonic acid, maleic acid and fumaric acid, hydroxyalkyl ester (meth)acrylate such as 2-hydroxyethyl (meth)acrylate, 4-hydroxybutyl (meth)acrylate, 2-hydroxypropyl (meth) acrylate, 3-hydroxypropyl (meth)acrylate, 2-hydroxybutyl (meth)acrylate, 3-hydroxybutyl (meth)acrylate, and monoalkyl aminoalkyl (meth)acrylate such as mono(meth)yl aminoethyl (meth)acrylate, monoethyl aminoethyl (meth)acrylate, mono(meth)yl aminopropyl (meth)acrylate, monoethyl aminopropyl (meth)acrylate. These may be used alone or in combination.

In addition to the above-described crosslinkable monomer having the crosslinkable functional group, the crosslinkable acrylic polymer is preferably produced by adding a (meth)acrylate ester monomer and copolymerization. The (meth)acrylate includes acrylic acid and methacrylic acid. It is the same case with other similar terms. Specific examples of the (meth)acrylate ester may include (meth)yl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, permitil (meth)acrylate and stearyl (meth)acrylate. These may be used alone or in combination. In particular, the crosslinkable acrylic polymer may be a copolymer including 10 to 30 parts by weight of methyl acrylate based on 100 parts by weight of the crosslinkable acrylic polymer.

Additionally, to give good adhesion strength, a nitrogen containing ethylenically unsaturated monomer may be further included as component. Examples of the nitrogen containing ethylenically unsaturated monomer may include methacrylamide, N-methylol methacrylamide, N-methyl methacrylamide, methoxyethyl methacrylamide, N-vinylpyrrolidone, N,N-dimethyl methacrylamide, N,N-diethyl methacrylamide, N,N-diisopropyl methacrylamide, N-vinylcaprolactam, N-methacryloylmorpholine. In some cases, in addition to the above-described monomer components, the crosslinkable acrylic polymer may further include vinyl esters, for example, vinyl acetate and vinyl propionate, olefins, for example, ethylene, propylene and isobutylene, halogenated olefins, for example, vinyl chloride and vinylidene chloride, aromatic vinyl monomers, for example, styrene, methylstyrene and vinyltoluene, diene-based monomers, for example, butadiene, isoprene and chloroprene, and nitrile-based monomers, for example, methacrylonitrile.

The solvent may include aromatic hydrocarbon, for example, toluene and xylene or aliphatic hydrocarbon, for example, hexane, ester, for example, ethyl acetate, and ketone, for example, methylethylketone, but is not limited thereto.

The adhesive composition may include various types of additives if necessary. For example, an antistatic agent, a chain transfer agent, a surfactant, a plasticizer, a leveling agent, an antioxidant, a corrosion inhibitor, a light stabilizer and a UV absorber may be appropriately used according to the purpose of use.

The acrylic adhesive composition may include, for example, 20 to 25 weight % of solids based on the total weight of the acrylic adhesive composition.

The acrylic adhesive composition may be prepared, for example, by mixing the above-described components together and stirring, and the haze adhesive film 13 of the present disclosure may be manufactured by coating the acrylic adhesive composition on one or two surfaces of various types of supports and thermally curing. The support may be a release film, for example, a resin film, and in the resin film, resin may include, for example, polyester, polypropylene, polyethylene, polyvinylcarbonate and their laminates.

The haze adhesive film 13 may be disposed on any one surface of the polarizer 11, i.e., under or on the polarizer 11 as shown in FIGS. 1A and 1B, respectively. Here, the upward direction is a direction facing a user in the display device as described below. Although FIGS. 1A and 1B show two polarizing plates 10a and 10b separately according to the position of the haze adhesive film 13, this is to indicate a direction when stacking the polarizing plate in the display device, and the polarizing plates 10a and 10b actually manufactured in the form of film products are identical.

Meanwhile, the polarizing plates 10a and 10b may further include protective films 12, each stacked on each of the two surfaces of the polarizer 11, i.e., between one surface of the polarizer 11 having the haze adhesive film 13 and the haze adhesive film 13 and the other surface of the polarizer 11 having no haze adhesive film 13. The protective film 12 is a film made of resin, for example, Tri-Acetyl Cellulose (TAC) and polyester, as known in the art. Additionally, although not shown, an adhesive film with no haze (in which beads having haze are not dispersed) may be additionally stacked on the protective film 12 disposed on a side to which the haze adhesive film 13 is not attached. As well known, the adhesive film may be an adhesive film formed by thermally curing an acrylic polymer as described above.

The configuration including the polarizer 11 and the protective films 12 attached to the two surfaces, exclusive of the haze adhesive film 13 from the polarizing plates 10a and 10b shown in FIGS. 1A and 1B, or further including the adhesive film with no haze is a common polarizing plate 10 with no haze. Additionally, in the accompanying drawings including FIGS. 1A and 1B, 10a and 10b are the polarizing plates having the haze adhesive film 13 according to the present disclosure.

The display device according to another aspect of the present disclosure is a display device having a dual cell structure, in which any one of at least three layers of polarizing plates included in the display device is the polarizing plate of the above-described embodiment. That is, the display device according to the present disclosure is a display device including at least two layers of display cells including an upper display cell and a lower display cell disposed at higher and lower positions, each having a matrix array to display an image; and at least three layers of polarizing plates including an upper polarizing plate disposed on the upper display cell, an intermediate polarizing plate disposed between the upper display cell and the lower display cell and a lower polarizing plate disposed under the lower display cell, wherein any one of the upper polarizing plate, the intermediate polarizing plate and the lower polarizing plate is the polarizing plate of the above-described embodiment.

The display device according to the present disclosure may or may not include an element which restricts a viewing angle such as a so-called louver film.

Additionally, the display device according to the present disclosure may be an automobile display device mounted in a vehicle. In this case, when considering the fact that the automobile display device is commonly mounted at the center of the dashboard (between the driver's seat and the passenger's seat), preferably, the automobile display device does not include the element which restricts a viewing angle.

Subsequently, the display device according to another embodiment of the present disclosure will be described in detail with reference to the accompanying drawings.

Figure 2:
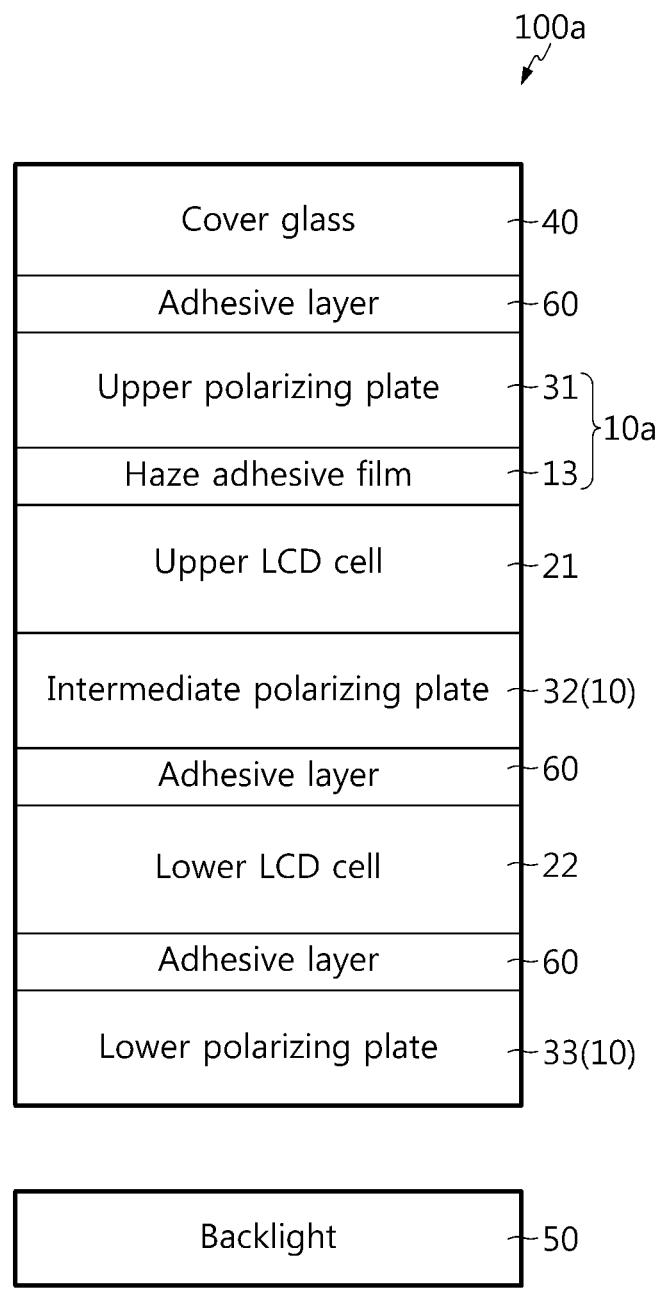
FIG. 2 is a schematic cross-sectional view of a display device according to another embodiment of the present disclosure.

FIG. 2 is a schematic cross-sectional view of the display device according to another embodiment of the present disclosure.

Referring to FIG. 2, the display device 100a according to this embodiment is a so-called dual cell LCD device. That is, when a direction facing the user of the display device 100a is an upward direction, the at least two layers of display cells may include an upper display cell 21 (an upper LCD cell) and a lower display cell 22 (a lower LCD cell) disposed at upper and lower positions. Here, any one of the upper display cell 21 and the lower display cell 22 may be a color LCD cell and the other may be a black and white LCD cell (a mono cell), or both may be a color LCD cell.

Additionally, the at least three layers of polarizing plates may include an upper polarizing plate 31 disposed on the upper display cell 21, an intermediate polarizing plate 32 disposed between the upper display cell 21 and the lower display cell 22, and a lower polarizing plate 33 disposed under the lower display cell 22.

Additionally, as shown in FIG. 2, the display device 100a according to this embodiment may include a backlight 50 on the bottommost side and a cover glass 40 on the topmost side. Additionally, an adhesive layer 60 that adheres two adjacent layers may be interposed between each layer if necessary. The adhesive layer 60 is a commonly used transparent adhesive layer with no haze, and may be a film type such a double sided adhesive tape called an Optically Clear Adhesive (OCA) or a liquid type called an Optically Clear Resin (OCR).

Meanwhile, the configuration, operation and manufacturing method of each element of the LCD device 100a having a dual cell structure are widely known, and a detailed description is omitted.

As described above, the LCD device having a dual cell structure includes the total of three polarizing plates, i.e., the upper polarizing plate 31, the intermediate polarizing plate 32 and the lower polarizing plate 33, and in the display device 100a of this embodiment, the upper polarizing plate 31 is the polarizing plate 10a having the haze adhesive film 13 according to the above-described embodiment. In this instance, the upper polarizing plate 31 is preferably stacked on the upper display cell 21, such that the haze adhesive film 13 of the polarizing plate 10a comprising the upper polarizing plate 31 is disposed under the upper polarizing plate 31, i.e., under the polarizer 11 (see FIG. 1A) as shown in FIG. 2. In case that the haze adhesive film 13 is disposed on the polarizer 11, haze is imparted to the substantially topmost layer of the display device, and thus the user may see a blurred image, and scattering light (to impart haze) before the light is polarized by the polarizer is more effective in reducing moire or rainbow occurring by diffraction and interference of light.

Figure 3:
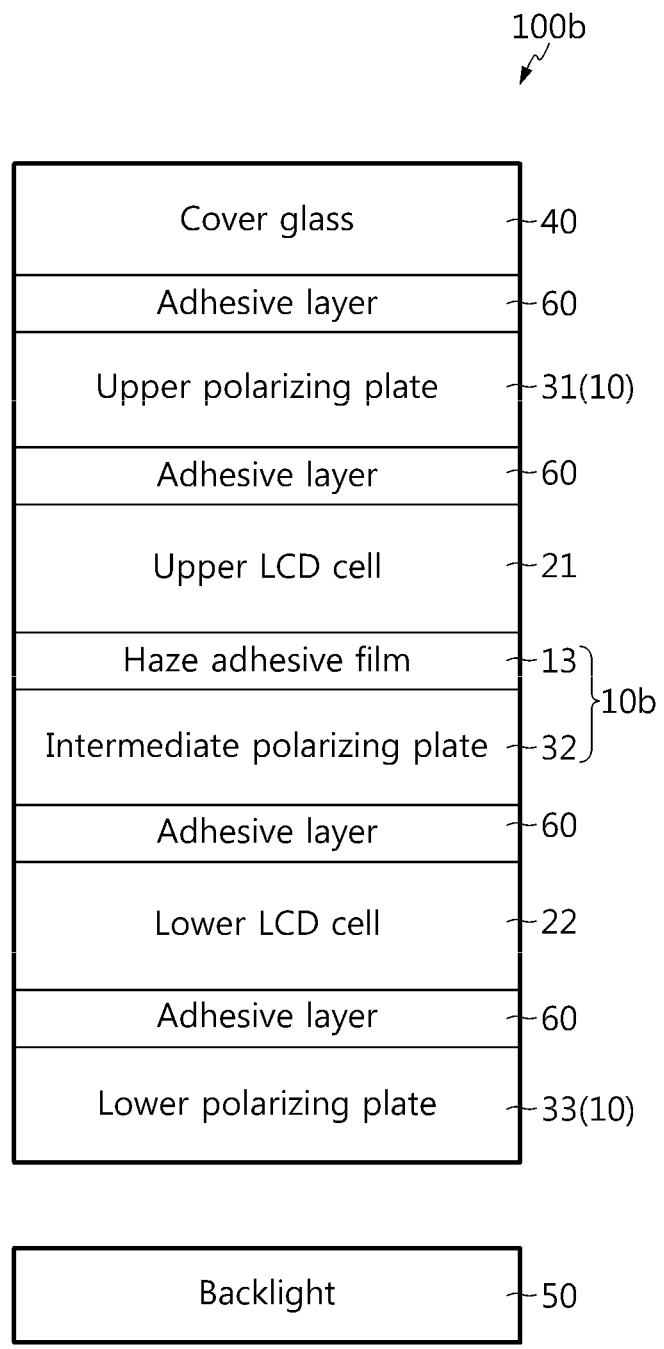
FIG. 3 is a schematic cross-sectional view of a display device according to still another embodiment of the present disclosure.

FIG. 3 is a schematic cross-sectional view of a display device according to another embodiment. The display device 100b according to this embodiment will be described based on difference(s) from the display device 100a according to the above-described embodiment described with reference to FIG. 2.

Referring to FIG. 3, the display device 100b according to this embodiment is also an LCD device having a dual cell structure. A difference of the display device 100b according to this embodiment from the display device 100a according to the above-described embodiment is that among the total of three polarizing plates, i.e., the upper polarizing plate 31, the intermediate polarizing plate 32 and the lower polarizing plate 33, the intermediate polarizing plate 32 is the polarizing plate 10b having the haze adhesive film 13 according to the above-described embodiment. In this instance, although FIG. 3 shows that the intermediate polarizing plate 32 is stacked on the lower display cell 22 such that the haze adhesive film 13 of the polarizing plate 10b comprising the intermediate polarizing plate 32 is disposed on the intermediate polarizing plate 32, i.e., on the polarizer 11 (see FIG. 1B), the haze adhesive film 13 of the polarizing plate comprising the intermediate polarizing plate 32 may be stacked under the intermediate polarizing plate 32, i.e., under the polarizer 11 (see FIG. 1A).

Figure 4:
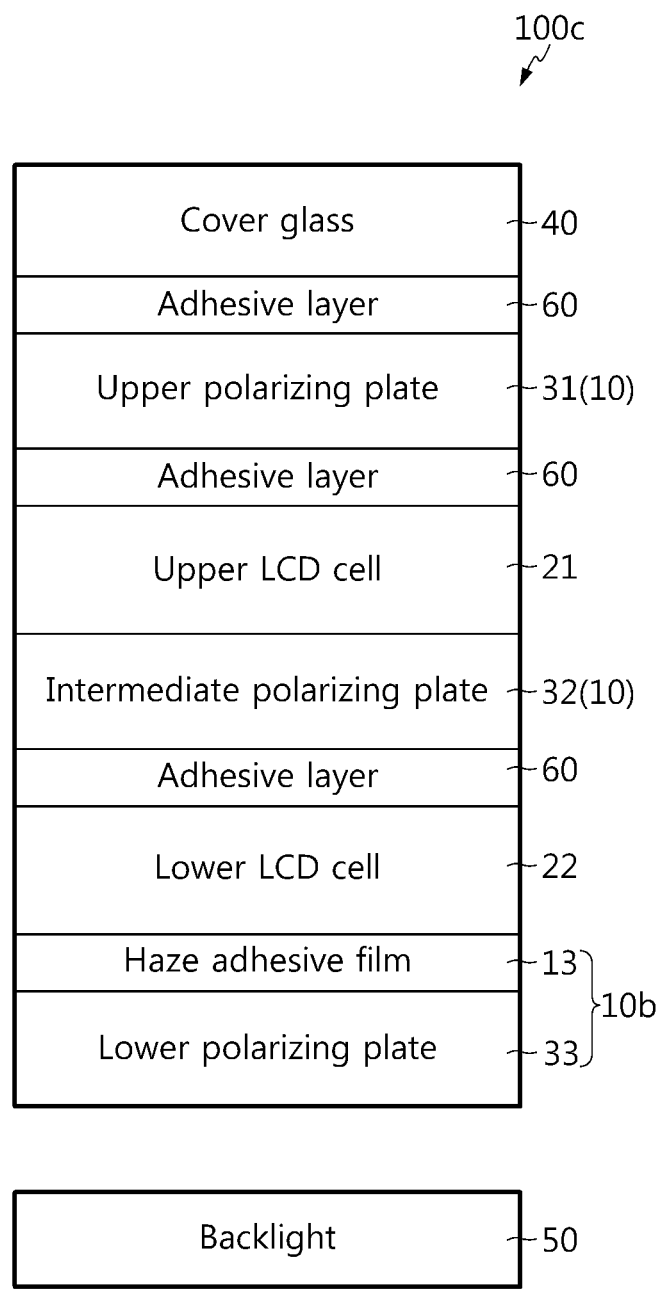
FIG. 4 is a schematic cross-sectional view of a display device according to yet another embodiment of the present disclosure.

FIG. 4 is a schematic cross-sectional view of a display device according to still another embodiment. The display device 100c according to this embodiment will be described based on difference(s) from the display device 100a according to the above-described embodiment described with reference to FIG. 2.

Referring to FIG. 4, the display device 100c according to this embodiment is also an LCD device having a dual cell structure. A difference of the display device 100c according to this embodiment from the display device 100a according to the above-described embodiment is that among the total of three polarizing plates, i.e., the upper polarizing plate 31, the intermediate polarizing plate 32 and the lower polarizing plate 33, the lower polarizing plate 33 is the polarizing plate 10b having the haze adhesive film 13 according to the above-described embodiment. In this instance, as shown in FIG. 4, the lower polarizing plate 33 may be stacked under the lower display cell 22 such that the haze adhesive film 13 of the polarizing plate 10b comprising the lower polarizing plate 33 is disposed on the lower polarizing plate 33, i.e., on the polarizer 11 (see FIG. 1B). This is because the backlight 50 is manufactured as a separate component from the display panel lying thereon (the entire stack structure from the lower polarizing plate 33 to the cover glass 40), and is stacked and fixed without an adhesive film or an adhesive.

Meanwhile, although the embodiments described with reference to FIGS. 2 to 4 describe the polarizing plates 10a or 10b having the haze adhesive film 13 according to the above-described embodiment are applied to the LCD devices 100a, 100b, 100c having a dual cell structure, the polarizing plates 10a or 10b having the haze adhesive film 13 according to the above-described embodiment may be applied to an LCD device having only a single layer LCD cell or an organic light-emitting diode (OLED) display device as a display device.

Hereinafter, the present disclosure will be described in detail by describing the embodiments. However, the embodiments of the present disclosure may be modified in many different forms, and the scope of the present disclosure should not be interpreted as being limited to the embodiments described below. The embodiments of the present disclosure are provided to describe the present disclosure thoroughly and completely for those skilled in the art.

Example 1 and Comparative Examples 1 to 3

A polarizer (22 μm in thickness) is manufactured by swelling a polyvinylalcohol film (thickness: 60 μm, Kuraray, VF-PS #6000) in a 25° C. aqueous solution, dyeing in a dye bath of 30° C., additionally stretching the dyed polyvinylalcohol film in a 55° C. boric acid solution such that the final elongation is about 5.9 times.

Meanwhile, a polarizing plate is manufactured by adhering a haze adhesive film manufactured as below to one surface of the polarizer.

Preparation of an Acrylic Adhesive Composition Containing Silica Beads

Acrylic polymer having the weight average molecular weight of 1,800,000, a curing agent and silica beads (Momentive T-145) having the particle size of 4-5 μm according to the composition ratio of the following Table 1 are mixed with a solvent (ethyl acetate) to prepare an acrylic adhesive composition having the presented solids content.

In the following Table 1, among the types of monomers used in the polymerization of the acrylic polymer, BA is butyl acrylate, MA is methyl acrylate, BzA is benzyl acrylate, AA is acrylic acid, and 4-HBA is 4-hydroxybutylacrylate. Additionally, SCA is a silane coupling agent, and an antistatic agent is a product from 3M.

Table 1 indicates the amounts of components other than the acrylic polymer based on 100 parts by weight of the acrylic polymer.

TABLE 1

|  | Composition ratio of acrylic polymer (100 parts by weight) | Type of curing agent and amount (parts by weight) | SCA (parts by weight) | Antistatic agent (weight %) | Beads |
|---|---|---|---|---|---|
| Example 1 | BA/MA/BzA/ AA/4-HBA (63.8/20/ | TDI curing agent (1.5) | 0.15 | 1.5 | 11 |
| Comparative example 1 | | Epoxy | | | — |

TABLE 1-continued

| | Composition ratio of acrylic polymer (100 parts by weight) | Type of curing agent and amount (parts by weight) | SCA (parts by weight) | Antistatic agent (weight %) | Beads |
|---|---|---|---|---|---|
| Comparative example 2 | 15/1/0.2) | curing agent | | | 7 |
| Comparative example 3 | | (0.0075) | | | 8 |

Preparation of a Haze Adhesive Film

The acrylic adhesive compositions of example and comparative examples are coated on a release film, and dried at 80° C. for 3 minutes to an adhesive film at the thickness level of 20 μm.

<Haze Evaluation of Haze Adhesive Film>

Haze is measured using a haze meter.

<Properties Evaluation of a Haze Adhesive Film>

The manufactured polarizing plate having the haze adhesive film is stored at room temperature for 3 days, and the properties of the haze adhesive film are evaluated by the following method.

Glass adhesion strength: Samples having the width of 25 mm and the length of 200 mm are manufactured, attached to glass, stored at room temperature for 1 hour, and peeled off at 90° using a peeler, and glass adhesion strength is evaluated by the peel test.

Heat resistance reliability: Samples having the width of 15 cm and the length of 20 cm are manufactured and attached to glass, and debubbled in the conditions of 50° C. and 5 atmospheric pressure. Subsequently, each sample is stored at 95° C. for 500 hours and evaluated as below according to the number of bubbles formed in an area of 5 cm*5 cm, and the results are shown in Table 2.

⊚: no bubble
o: less than 5 bubbles
Δ: 5~9 bubbles
X: 10 or more bubbles or swollen <Evaluation of Presence or Absence of a Moire Phenomenon in a Dual Cell LCD Device Having a Haze Adhesive Film>

The polarizing plate 10a having the haze adhesive film 13 manufactured by the above-described method is attached to the upper surface of the upper LCD cell 21, the lower LCD cell 22 which is the same LCD cell as the upper LCD cell is stacked thereon, and a moire phenomenon (the presence or absence of rainbow stain) is detected with an eye in black mode.

TABLE 2

| Adhesive film | Type of acrylic adhesive film | Haze (%) | Glass adhesion strength (gf/25 min) | Presence or absence of rainbow stain | Heat resistance reliability |
|---|---|---|---|---|---|
| Preparation example 1 | Example 1 | 57 | 320 | absent | ⊚ |
| Preparation example 2 | Comparative example 1 | 3 | 654 | present | ⊚ |
| Preparation example 3 | Comparative example 2 | 42 | 423 | present | ⊚ |
| Preparation example 4 | Comparative example 3 | 46 | 412 | present | ⊚ |

As presented in Table 2, it can be seen that example 1 using the polarizing plate having the haze adhesive film with adjusted haze to the specific range does not show a moire phenomenon, while comparative examples using the polarizing plate having the haze adhesive film with no haze or haze beyond the specific range show a moire phenomenon.

DESCRIPTION OF REFERENCE NUMERALS

10: Polarizing plate
10a, 10b: Polarizing plate having haze adhesive film
11: Polarizer
12: Protective film
13: Haze adhesive film
21: Upper display cell (Upper LCD cell)
22: Lower display cell (Lower LCD cell)
31: Upper polarizing plate
32: Intermediate polarizing plate
33: Lower polarizing plate
40: Cover glass
50: Backlight
60: Adhesive layer
100a, 100b, 100c: Display device

What is claimed is:

1. A display device, comprising:
an upper liquid crystal display cell;
a lower liquid crystal display cell;
an upper polarizing plate disposed above the upper liquid crystal display cell;
an intermediate polarizing plate disposed between the upper liquid crystal display cell and the lower liquid crystal display cell;
a lower polarizing plate disposed under the lower liquid crystal display cell; and
a backlight disposed on a bottommost side, and stacked to the lower polarizing plate without an intervening layer,
wherein at least one of the upper polarizing plate, the intermediate polarizing plate or the lower polarizing plate is a polarizing plate comprising:
a polarizer; and
a haze adhesive film disposed on a surface of the polarizer and having a haze of 49% to 65%,
wherein a total number of the haze adhesive film and an optional additional haze adhesive film deposited above the upper liquid crystal display cell facing away from the lower liquid crystal display cell is no more than one.

2. The display device according to claim 1, wherein the haze adhesive film has a haze of 50% to 60%.

3. The display device according to claim 1, wherein the haze adhesive film has a thickness of 20 to 22 um.

4. The display device according to claim 1, wherein the polarizing plate further comprises:
a first protective film stacked between one surface of the polarizer and the haze adhesive film; and
a second protective film stacked on the other surface of the polarizer.

5. The display device according to claim 1, wherein the haze adhesive film comprises an acrylic polymer having beads uniformly dispersed therein.

6. The display device according to claim 5, wherein the beads are silica beads.

7. The display device according to claim 1, wherein the display device does not include a louver film.

8. The display device according to claim 1, wherein the display device is mounted in a vehicle.

9. The display device according to claim 1, wherein the upper polarizing plate is the polarizing plate, and wherein the upper polarizing plate is stacked on the upper liquid crystal display cell such that the haze adhesive film is disposed between the polarizer and the upper liquid crystal display cell.

10. The display device according to claim 1, wherein the lower polarizing plate is the polarizing plate, and wherein the lower polarizing plate is stacked under the lower liquid crystal display cell such that the haze adhesive film is disposed between the lower liquid crystal display cell and the polarizer.

11. The display device according to claim 1, wherein the intermediate polarizing plate is the polarizing plate, and wherein the intermediate polarizing plate is stacked between the upper liquid crystal display cell and the lower liquid crystal display cell such that the haze adhesive film is disposed on either the upper liquid crystal display cell or the lower liquid crystal display cell.

12. The display device according to claim 1, wherein at least one of the upper liquid crystal display cell or the lower liquid crystal display cell is a color liquid crystal display cell.

\* \* \* \* \*